US008677177B2

(12) United States Patent
Tabuchi

(10) Patent No.: US 8,677,177 B2
(45) Date of Patent: Mar. 18, 2014

(54) APPARATUS, A RECOVERY METHOD AND A PROGRAM THEREOF

(75) Inventor: Yoji Tabuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 540 days.

(21) Appl. No.: 12/969,226

(22) Filed: Dec. 15, 2010

(65) Prior Publication Data

US 2011/0145634 A1 Jun. 16, 2011

(30) Foreign Application Priority Data

Dec. 16, 2009 (JP) .................................. 2009-285491

(51) Int. Cl.
*G06F 11/00* (2006.01)

(52) U.S. Cl.
USPC .................... 714/5.1; 714/10; 714/23; 714/44

(58) Field of Classification Search
USPC ................. 714/5.1, 10, 11, 23, 30, 31, 43, 44
See application file for complete search history.

(56) References Cited

U.S. PATENT DOCUMENTS

| 7,103,808 B2 * | 9/2006 | Kitamorn et al. ............... 714/44 |
| 7,549,090 B2 * | 6/2009 | Bailey et al. ..................... 714/43 |
| 8,037,364 B2 * | 10/2011 | Kern et al. ..................... 714/47.1 |
| 2008/0126852 A1 * | 5/2008 | Brandyberry et al. ........... 714/8 |
| 2008/0288828 A1 * | 11/2008 | Baker et al. ...................... 714/47 |
| 2009/0119546 A1 * | 5/2009 | Ageishi ........................... 714/43 |
| 2010/0306589 A1 * | 12/2010 | Bennett et al. ................. 714/30 |

FOREIGN PATENT DOCUMENTS

| JP | 60-191353 A | 9/1985 |
| JP | 2938495 B2 | 10/1991 |
| JP | 2009-116642 A | 5/2009 |

* cited by examiner

*Primary Examiner* — Joseph D Manoskey
(74) *Attorney, Agent, or Firm* — Sughrue Mion, PLLC

(57) ABSTRACT

An apparatus and method for automatically recovering a hardware when the hardware is not accessible from the processing unit. The hardware is recovered via a path different from a path which the processing unit uses when the processing unit fails to access to the hardware via the path initially used.

30 Claims, 3 Drawing Sheets

APPARATUS, A RECOVERY METHOD AND A PROGRAM THEREOF

This application is based upon and claims the benefit of priority from Japanese patent application No. 2009-285491, filed on Dec. 16, 2009, the disclosure of which is incorporated herein in its entirety by reference.

BACKGROUND

The present invention relates to an apparatus, a recovery method and a program thereof. More particularly, it relates to an apparatus, a recovery method and a program thereof capable of automatically recovering a PCI (peripheral component interconnect) bus when a failure of the PCI bus occurs in a computer system.

In a related technology, there is known a computer system which has a recovery means established in order to recover a failure such as PCI bus failure in the computer system. The recovery of the PCI bus is executed by the cooperation between an OS (operating system) as driver, an ACPI (advanced configuration and power interface) and a BIOS (basic input/output system).

The failure recovery method in the related technology is described below. The failure recovery method is an OS-driven method.

(1) As a control operation of an OS, firstly, the OS detects that the failure of the PCI bus occurs.

(2) Next, as a recovery instruction to the ACPI from the OS having detected the failure, the OS issues a PCI recovery request to the ACPI after a control driver of the PCI card is stopped.

(3) Then, as a recovery instruction from the ACPI to the BIOS, the ACPI issues, to the BIOS, a reset request for the PCI bus by using a PMI (platform management interrupt or performance monitoring interrupt).

(4) Subsequently, as a PCI bus reset process in the BIOS, the BIOS resets the PCI bus and executes a recovery of the PCI bus.

(5) Thereafter, as a recovery result reporting process in the ACPI, the BIOS reports the recovery result to the OS via the ACPI.

(6) Lastly, as a driver re-installation process in the OS, upon receipt of the report that the PCI bus has restored successfully, the OS re-installs the control driver of the PCI bus and the device is started to use again.

Incidentally, it is well-known that the above-mentioned PMI is an interrupt function caused by the processor, and is an interrupt function for calling platform firmware.

In this field, for example, JP-A 2009-116642 (Patent Document 1) discloses a PCI-bus failure recovery method. In Patent 1, a recovery processing method including the following steps is described. PCI bus detection means detects a blocked PCI bus, and requests the OS to detach this blocked PCI bus and a PCI card connected to a PCI bus downstream of the blocked PCI bus. The OS detaches the requested PCI card from control and outputs an instruction for turning off the power of the PCI card to the BIOS. In response to this, PCI card detachment accepting means activates PCI bus diagnosis means. The PCI bus diagnosis means determines whether or not the blocked PCI bus can operate'normally, and if it can operate normally, PCI bus blockage clearance means clears the blockage of the PCI bus.

Meanwhile, JP-A Sho 60-191353 (Patent Document 2) discloses the following technique as a bus control system for controlling a common device. The system includes multiple processors, bus control circuits corresponding to the respective processors, and a common bus making connection with the common device shared by the processors. The technique has major points: providing each of the bus control circuits with a means for detecting that any of the processors halts control of the common device, and a means for generating a common bus occupancy cancellation signal when the halt continues for a certain time period; and a means for cutting off the connection between the processor and the common device in response to the common bus occupancy cancellation signal.

Further, JP-B 2938495 (Patent Document 3) discloses a technique for a network monitoring device in a network including multiple transmission devices, transmission paths connecting the transmission devices, and a monitor control device monitoring these paths. The technique is characterized in that two monitoring lines are provided between the monitor control device and a predetermined transmission device and the monitoring line to be used in polling is separated from the monitoring line to be used when a failure occurs.

However, in the related technology such as Patent 1, there is a problem that even when the OS issues a recovery instruction at a timing when the BIOS is temporarily unable to operate, such as during interrupt masking, the OS is forced to give up the recovery of the PCI bus.

Therefore, it is impossible to automatically recover the failure of the PCI bus in the related technology. As a result, at occurrence of a failure, a maintenance personnel needs to perform the operations such as detachment and re-installation of the PCI device, causing a problem of increasing failure recovery time.

Note that the techniques disclosed in Patent 2 and Patent 3 are merely related techniques.

SUMMARY OF THE INVENTION

Following are main features of the present invention.

(1) Automatic recovery means controlled by a BIOS, BMC (Baseboard Management Controller), and ACPI in platform are provided in addition to the OS-driven recovery process, as a means for detecting and recovering the failure of a extension card such a PCI bus.

(2) If the OS-driven recovery is impossible, bus detachment and reconnection instructions are given by the platform (BIOS-BMC)-controlled automatic recovery means.

A non-limiting object of the present invention is to provide an apparatus, a recovery method and a program capable of automatically executing a recovery processing in an interrupt masking condition.

Another non-limiting object of the present invention is to provide an apparatus, a recovery method and a program capable of automatically executing a re-installation of the PCI device by the OS.

A non-limiting feature of the invention is that a failure of a hardware is recovered via a path different from a path which a processing unit uses when the processing unit fails to access to the hardware.

According to another non-limiting feature there is provided a method for carrying out a second recovering which recovers a failure of a hardware via a path different from a path used when the hardware is not accessible.

According to another non-limiting feature there is provided a medium storing a program for a computer to carry out a recovering which recovers a failure of a hardware via a path different from an initial path used when the hardware is not accessible for recovering via the initial path.

BRIEF DESCRIPTION OF THE DRAWING

The above and other aspects of the present invention will become more apparent by describing in detail exemplary embodiment thereof with reference to the attached drawings in which.

DETAILED DESCRIPTION

Figure 1:
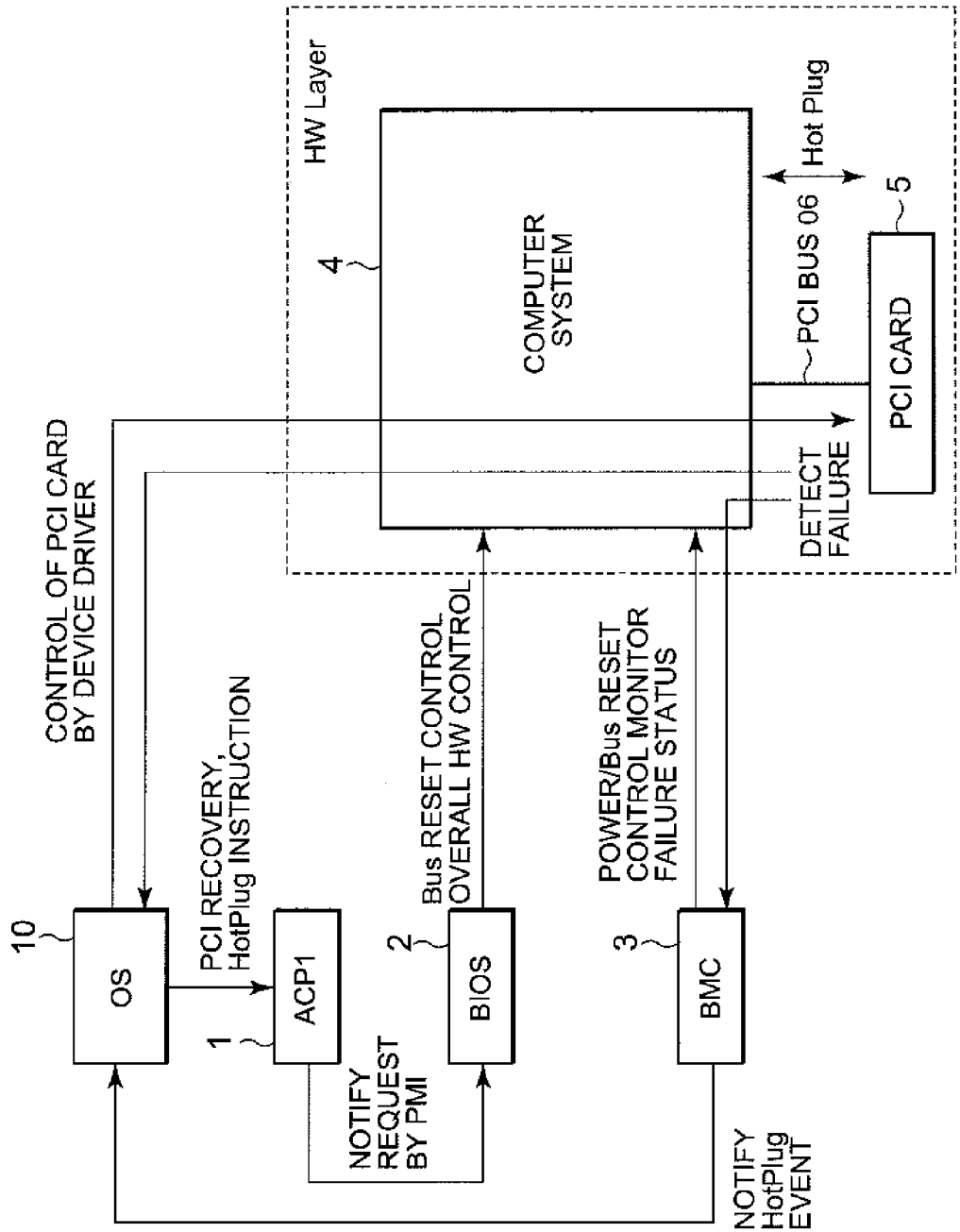
FIG. 1 is a configuration diagram showing a configuration of an information processing device in a first exemplary embodiment of the present invention.

A first exemplary embodiment of the present invention will be explained in detail with reference to drawings.

A information processing device according to the present invention has a function of controlling an automatic recovery process when a PCI bus failure occurs in a computer system.

A feature of the examples of the present invention is that it is possible to execute a platform (BMC)-controlled automatic recovery in addition to the OS-instructed recovery process, as the PCI-bus failure recovery means. As a result, it is possible to execute an effective recovery process even when the OS-driven recovery process is not executable because of an interrupt masking condition.

In other words, in the OS-instructed recovery process, an instruction might be informed from the ACPI to the BIOS in a condition of the interrupt masking such as execution of another interrupt process or failure process. In this case, there is a timing that the BIOS is unable to operate.

Hence, in this exemplary embodiment, upon detection of a failure, a recovery state of the PCI bus is monitored on the platform (BMC) side. And the PCI recovery process is controlled in a platform-driven manner if the recovery process on the OS side ends in failure due to the interrupt-masked condition. In addition, at this time, the OS is notified that the PCI bus is recovered, and the PCI HotPlug function is used to prompt re-installation of the control driver of the PCI bus. Generally, the HotPlug function is a function for inserting and removing a PCI card.

The procedure of the process will be described in detail with respect to FIG. 2.

(1) As a failure detection process in the BMC, the BMC detects a failure of PCI-bus by a hardware (hereinafter, "HW" is called) interrupt (step S201).

(2) Then, as a failure state monitoring process in the BMC, the BMC monitors the PCI-bus blocked state by monitoring a failure status register (step S202). The BMC further checks whether or not the recovery process by the OS has succeeded (step S203). Success of the recovery process by the OS is determined according to whether or not the failure status register is cleared within a predetermined time period.

(3) If it is determined that the recovery process by the OS has succeeded, the monitoring process in the BMC is stopped (step S204).

(4) If it is determined that the recovery process by the OS has failed, and a predetermined failure monitoring time passes, the BMC further determines that the recovery process by the OS is not executable because of the interrupt masking condition (step S205, step S206).

(5) Then, the platform-driven recovery is carried out (step S207). In other words, the BMC directly resets the PCI bus and carries out the recovery of the blocked PCI bus.

(6) Next, PCI-HotRemove/Add is executed in the BMC (step S208). In other words, after the BMC confirms the success of the recovery, the BMC issues a PCI-HotRemove instruction as well as a PCI-HotAdd instruction to the OS.

(7) Finally, the OS re-installs the control driver of the PCI bus (step S209). In other words, in response to normal completion of PCI-HotAdd, the OS re-installs the control driver of the PCI bus and then restarts a use of the PCI device.

FIG. 1 is a configuration diagram showing a configuration of the information processing device according to the exemplary embodiment of the present invention.

The computer system includes a processing unit such as an OS 10, an ACPI 1, a BIOS 2, a recovery unit such as a BMC 3, a computer system 4, a PCI card 5, and a PCI bus 6.

Following are explanations of the failure recovery function of the information processing device.

The OS 10 is an operating system which operates on the computer system 4, and includes a driver for controlling the PCI card, an I/F (Interface) for instructing a recovery to the ACPI, and a function for PCI HotPlug.

The ACPI 1 is firmware (hereinafter, called as "FW") which mediates between the OS 10 and the BIOS 2, and has a function of reporting a request from the OS 10 to the BIOS 2 by PMI interrupt, and a function for PCI HotPlug.

The BIOS 2 is FW for controlling the computer system 4, and has a function of executing a program when a PMI interrupt occurs.

The BMC 3 is a Base Management Controller (BMC). BMC 3 has a function of monitoring failures and status of HW, a function of controlling the computer system 4, and a function for PCI HotPlug. The computer system 4 is a HW main body which implements computer functions as HW, and has a function for PCI HotPlug, a function of notifying the BMC 3 of a detection of an HW failure, and a function of connecting the PCI card 5 through the built-in PCI bus 6.

The PCI card 5 is a device defined by the PCI specification, and supports the PCI HotPlug function.

The PCI bus 6 is a bus which connects the computer system 4 and the PCI card 5, and the connection by the bus between the computer system 4 and the PCI card 5 is cut off when a failure occurs.

Figure 3:
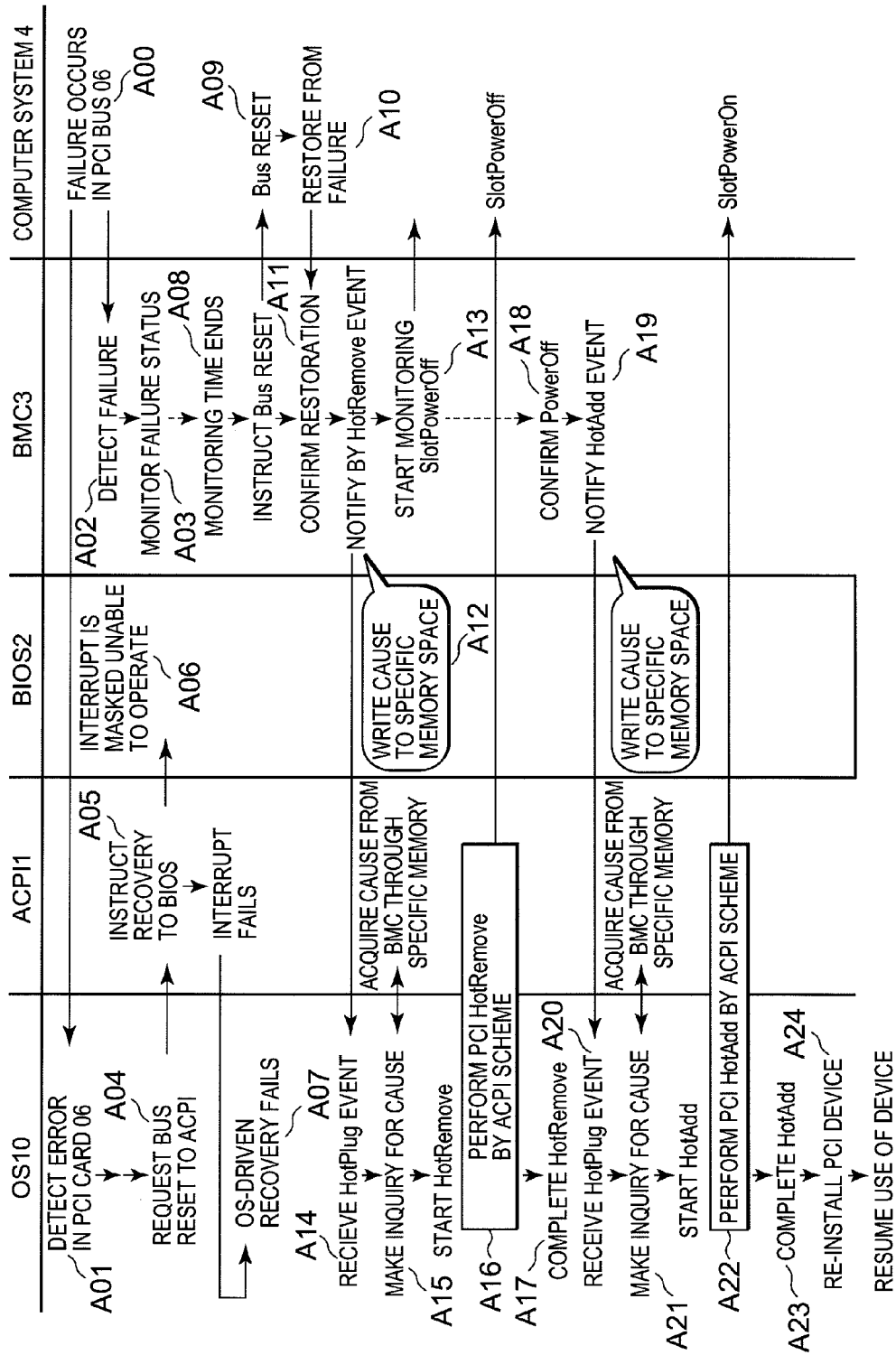
FIG. 3 is a timing chart showing operations of the information processing device in detail.

FIG. 3 is a timing chart showing operations of the information processing device according to this exemplary embodiment of the present invention.

Hereinafter, the operations of the information processing device are explained with reference to FIG. 1 and FIG. 3 in detail. In this case, the operation of the platform-driven recovery process is carried out instead of the OS 10-driven recovery process, because it is impossible to execute the OS 10-driven recovery process due to the interrupt-masking condition.

When a failure of the PCI bus 6 occurs (A00), a PCI card control driver of the OS 10 detects an error in the PCI card 5 (A01).

In response to an interrupt by the computer system 4, the BMC 3 also detects the failure (A02) and starts to monitor the failure status (A03).

On the other hand, upon detection of the failure, the OS 10 issues a request for resetting the PCI bus 6 to the ACPI 1 (A04). Upon receipt of the reset request, the ACPI 1 attempts to notify the failure to the BIOS 2 by a PMI interrupt (A05). However, the OS 10-driven recovery process ends in failure (A07) due to an interrupt-masking condition (A06).

On the other hand, the BMC 3 having been monitoring the failure status determines that the OS 10-driven recovery process has failed when a predetermined monitoring time passes (A08). Then the BMC 3 issues a request for resetting PCI bus 6 in order to execute the recovery by the BMC 3 itself (A09).

Therefore, in this exemplary embodiment, the recovery of the PCI bus 6 is executed by the BMC 3 resetting PCI bus 6. In fact, the BMC 3 can issue the request for resetting the PCI bus 6 by writing data in a PCI configuration space which is a register in computer system 4. This PCI configuration space is a domain where both the BMC 3 and BIOS 2 are directly accessible. That is, the BMC 3 can reset the PCI bus 6 without using BIOS 2.

After the BMC 3 recognizes the recovery of the failure (A10), the BMC 3 notifies the OS 10 of a PCI-HotRemove event of the PCI card 5 in which the failure had occurred (A11). Then, the BMC 3 sets a flag in a memory space which is determined in advance. After that, the BMC 3 notifies the OS 10 that a HotRemove request is issued based on PCI failure recovery (A12). Moreover, the BMC 3 monitors transition of the PCI card 5 to a powered-off state from a power-on state (A13).

Incidentally, the HotRemove is a function for removing a PCI card.

Upon receipt of the HotRemove request (A14), the OS 10 makes an inquiry to the ACPI 1 for the PCI card (the PCI card 5 in this case) which is the cause of the failure, instructs the ACPI 1 to perform HotRemove (A15), and executes the HotRemove by the ACPI scheme (A16).

When the HotRemove is completed (A17) and a power-off of the PCI card 5 is confirmed (A18), the BMC 3 issues a PCI HotAdd request to the OS 10 (A19).

Incidentally, the HotAdd request is a function for adding a PCI card.

Upon receipt of the HotAdd request (A20), the OS 10 makes an inquiry to the ACPI 1 for the PCI card in which the failure had occurred (A21), instructs the ACPI 1 to perform HotAdd, and executes the HotAdd by the ACPI scheme (A22).

Upon receipt of the notification that HotAdd has been completed (A23), the OS 10 restarts using the PCI card 5 by re-installing the PCI card (A24). Incidentally, re-installing the PCI card means that a driver for controlling the PCI card is installed.

Therefore, by providing two paths as the PCI recovery path, the PCI recovery process can be surely executed even under a condition where the BIOS 2 cannot execute a PCI bus reset for recovery, such as the interrupt masking state.

Note that although a case of expansion-card bus failure detection and its restoration process is explained in this exemplary embodiment, the same recovery method is acceptable in a failure detection and restoration process of the other general hardware.

Figure 2:
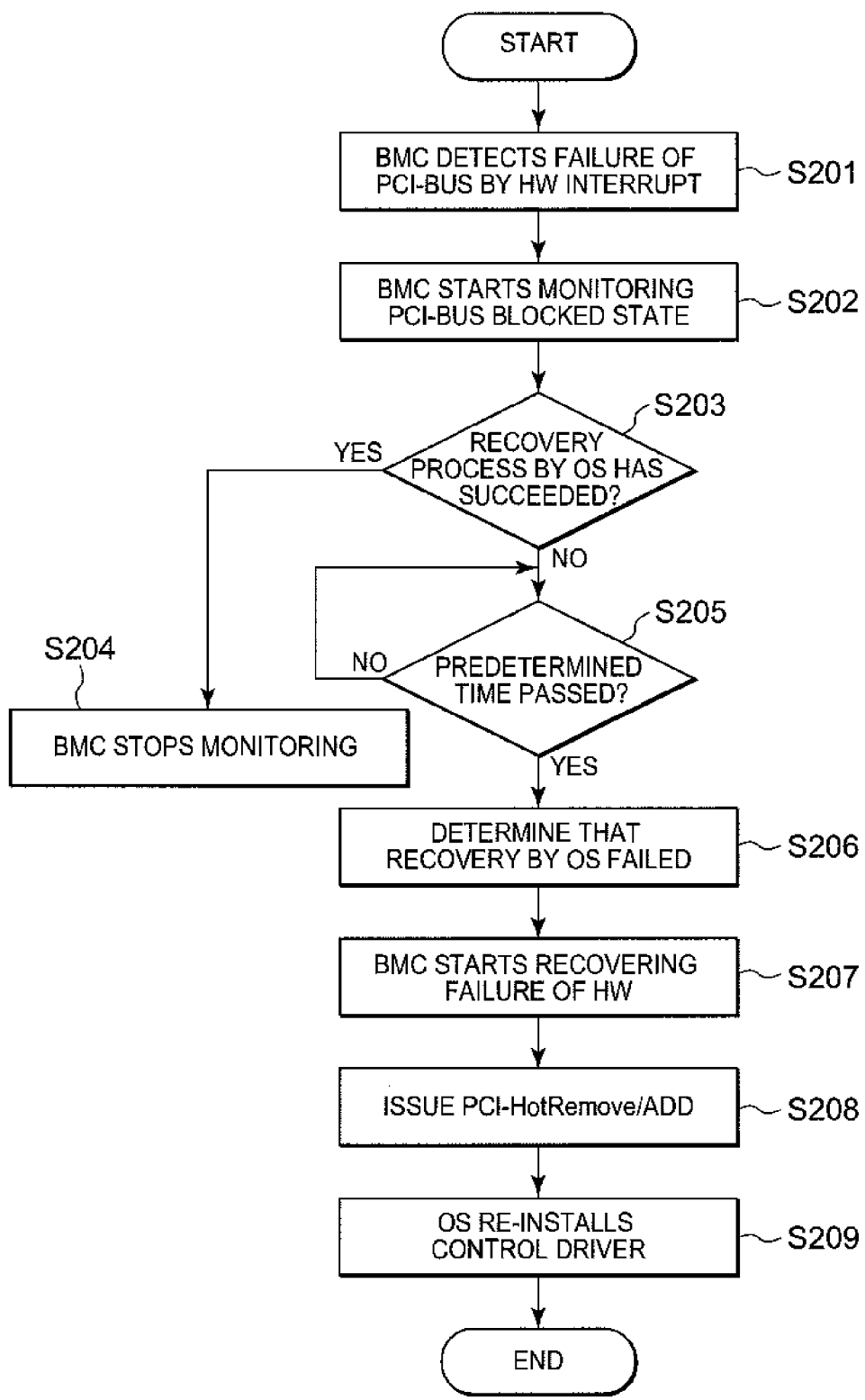
FIG. 2 is a flowchart showing a summary of the operations in the information processing device.

Moreover, a program that causes the computer 4 to execute the above-described process in FIG. 2 and FIG. 3 may be distributed by being stored in a computer-readable recording medium such as a semiconductor memory, a CD-ROM, and a magnetic tape. A computer at least including a microcomputer, a personal computer, and a general-purpose computer may read the program from the recording medium and execute the program.

What is claimed is:

1. An apparatus comprising:
a processing unit configured to recover a failure of a hardware,
a recovery unit configured to recover the failure of the hardware via a path different from a path which the processing unit uses when the processing unit fails to access to the hardware,
wherein the recovery unit is configured to inform a success of the recovery processing to the processing unit, and
the processing unit is configured to re-install a driver for controlling the hardware when the success of the receiver processing is informed.

2. The apparatus according to claim 1,
wherein the recovery unit is configured to recognize the failure of the hardware by a hardware interrupt.

3. The apparatus according to claim 1,
wherein the recovery unit is configured to recover the failure of the hardware when the processing unit does not execute a recovery processing within a predetermined time.

4. The apparatus according to claim 1,
wherein the recovery unit is configured to recover the failure of the hardware when the processing unit fails to access to the hardware due to an interrupt mask condition.

5. The apparatus according to claim 1,
wherein the processing unit and the recovery unit are configured to recover the failure of the hardware by resetting the hardware.

6. The apparatus according to claim 1,
wherein the processing unit and the recovery unit are configured to recover a failure of an extension card bus.

7. The apparatus according to claim 6,
wherein the processing unit is configured to re-install a driver for controlling the extension card.

8. The apparatus according to claim 1,
wherein the processing unit and the recovery unit are configured to recover a failure of a PCI (peripheral component interconnect) bus.

9. The apparatus according to claim 8,
wherein the processing unit is configured to re-install a driver for controlling the PCI card.

10. The apparatus according to claim 1,
wherein the recovery unit is a BMC(Baseboard Management Controller).

11. A recovery method comprising:
first recovering which recovers a failure of a hardware,
second recovering which recovers the failure of the hardware via a path different from a path used in the first recovering when the hardware is not accessible in the first recovering,
informing a success of a recovery processing, and
re-installing a driver for controlling the hardware when the success of the recovery processing is informed.

12. The recovery method according to claim 11, further comprising:
recognizing the failure of the hardware by a hardware interrupt in the second recovering.

13. The recovery method according to claim 11,
wherein the second recovering is executed when the first recovering is not executed within a predetermined time.

14. The recovery method according to claim 11, further comprising:
re-installing a driver for controlling the hardware in the second recovering.

15. The recovery method according to claim 11,
wherein the second recovering is executed when the hardware is not accessible due to an interrupt mask condition in the second recovering.

16. The recovery method according to claim 11,
wherein the first recovering and the second recovering are executed by resetting the hardware.

17. The recovery method according to claim 11,
wherein a failure of an extension card bus is recovered in the first recovering and the second recovering.

18. The recovery method according to claim 17, further comprising:
    re-installing a driver for controlling the extension card in the second recovering.

19. The recovery method according to claim 17,
    wherein a failure of a PCI (peripheral component interconnect) bus is recovered in the first recovering and the second recovering.

20. The recovery method according to claim 19, further comprising:
    re-installing a driver for controlling the extension card in the second recovering.

21. A non-transitory computer readable medium recording thereon a program for enabling a computer to carry out the following:
    first recovering which recovers a failure of a hardware,
    second recovering which recovers the failure of the hardware via a path different from a path used in the first recovering when the hardware is not accessible in the first recovering,
    informing a success of a recovery processing,
    re-installing a driver for controlling the hardware when the success of the recovery processing is informed.

22. The non-transitory computer readable medium recording thereon a program according to claim 21, the program further including instruction for causing:
    recognizing the failure of the hardware by a hardware interrupt in the second recovering.

23. The non-transitory computer readable medium according to claim 22,
    wherein the second recovering is executed when the first recovering is not executed within a predetermined time.

24. The non-transitory computer readable medium recording thereon a program according to claim 21, the program further including instruction for causing:
    re-installing a driver for controlling the hardware in the second recovering.

25. The non-transitory computer readable medium according to claim 21,
    wherein the second recovering is executed when the hardware is not accessible due to an interrupt mask condition in the second recovering.

26. The non-transitory computer readable medium according to claim 21,
    wherein the first recovering and the second recovering are executed by resetting the hardware.

27. The non-transitory computer readable medium according to claim 21,
    wherein a failure of an extension card bus is recovered in the first recovering and the second recovering.

28. The non-transitory computer readable medium recording thereon a program according to claim 27, the program further including instruction for causing:
    re-installing a driver for controlling the extension card in the second recovering.

29. The non-transitory computer readable medium according to claim 27,
    wherein a failure of a PCI (peripheral component interconnect) bus is recovered in the first recovering and the second recovering.

30. The non-transitory computer readable medium recording thereon a program according to claim 29, the program further including instruction for causing:
    re-installing a driver for controlling the extension card in the second recovering.

* * * * *